United States Patent [19]

Fohl

[11] Patent Number: 4,467,980
[45] Date of Patent: Aug. 28, 1984

[54] SAFETY BELT ROLL-UP DEVICE

[75] Inventor: Artur Fohl, Schorndorf, Fed. Rep. of Germany

[73] Assignee: REPA Feinstanzwerk GmbH, Alfdorf, Fed. Rep. of Germany

[21] Appl. No.: 242,178

[22] Filed: Mar. 10, 1981

[30] Foreign Application Priority Data

Mar. 24, 1980 [DE] Fed. Rep. of Germany ....... 3011283

[51] Int. Cl.³ ...................... A62B 35/02; B65H 75/48
[52] U.S. Cl. ...................... 242/107.4 B; 245/107.4 A
[58] Field of Search .............. 242/107.4 B, 107.4 A; 280/806; 297/478, 480

[56] References Cited

U.S. PATENT DOCUMENTS

| 4,027,829 | 6/1977 | Stephenson et al. | 242/107.4 B X |
| 4,083,512 | 4/1978 | Rumpf | 242/107.4 B X |
| 4,148,446 | 4/1979 | Sugar | 242/107.4 B X |
| 4,258,887 | 3/1981 | Fohl et al. | 242/107.4 B X |
| 4,293,106 | 10/1981 | Standing | 242/107.4 B X |

Primary Examiner—John M. Jillions
Attorney, Agent, or Firm—Yount & Tarolli

[57] ABSTRACT

Safety belt roll-up device with a mechanism for blocking the belt roller in case of danger. A control disc rotatably supported on the belt shaft moves when activated by a vehicle-and/or belt-sensitive sensor arrangement relative to the roller shaft. A control pawl is eccentrically and hingeably supported at the roller shaft. The control pawl at the occurrence of the mentioned relative motion is moved by the control disc against the force of a spring, and is coupled with a control part which effects the engagement of a locking lever in locking teeth. The control pawl and the control disc can be coupled to each other by a drive-projection, which is arranged in the immediate vicinity of the control pawl-tilt axis at one of these parts, and extends into the motion path of the other part.

2 Claims, 6 Drawing Figures

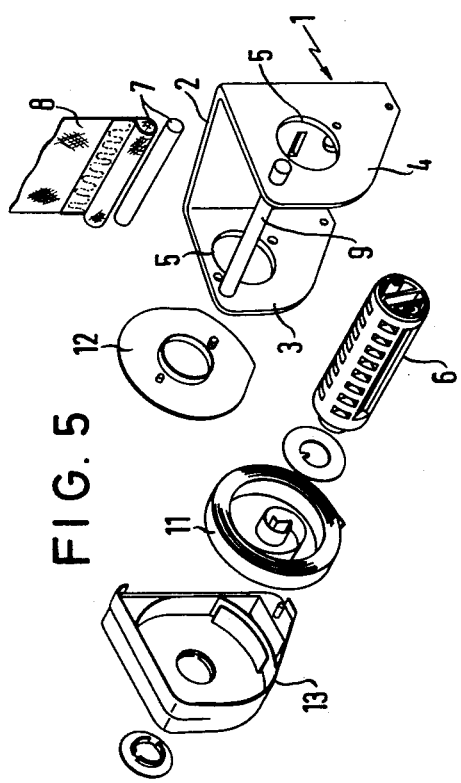
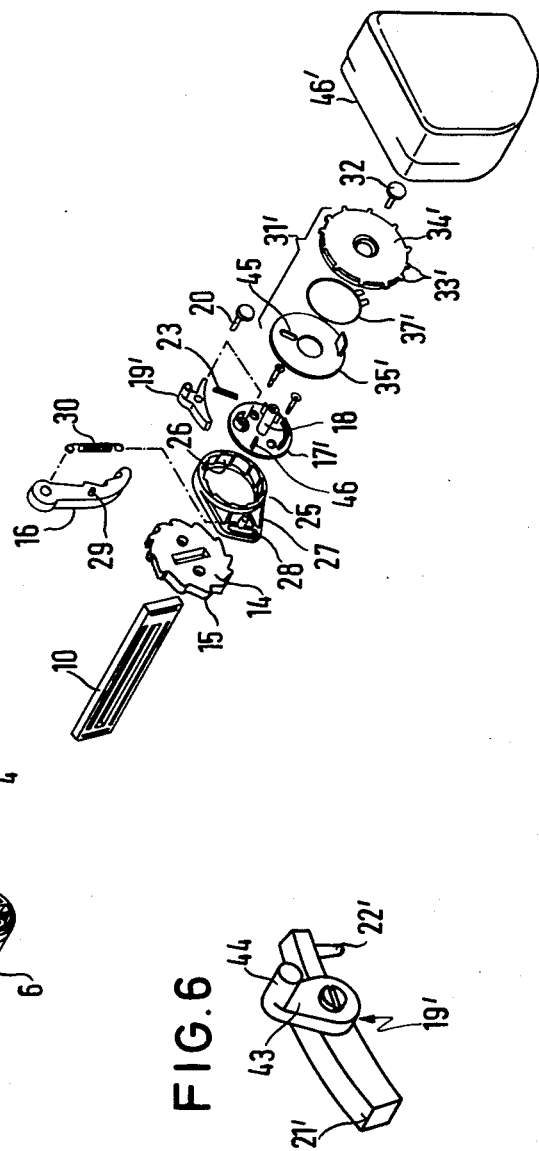

SAFETY BELT ROLL-UP DEVICE

BACKGROUND OF THE INVENTION

1. Field of the Invention

The invention relates to a safety belt roll-up device with a mechanism for blocking the belt roller in case of danger whereby a control disc rotatably supported on the belt shaft, when activated by a sensor moves a pawl.

2. Description of the Prior Art

In the known safety belt roll-up devices (U.S. Pat. No. 3,901,459) a wind-up spring to roll up the belt is arranged at one side of the belt shaft. The opposite shaft-end is in connection with a detenting locking device and also with a trigger mechanism (sensor arrangement), whereby in the case of danger, i.e. at the occurrence of an acceleration or deceleration which exceeds a permissible measure a trigger (release) mechanism, for example a device with an inertial mass, acts on a control disc. The control disc effects a blocking of the belt shaft by means of the detenting locking mechanism. In known devices of this kind, a two-armed control pawl is hingeably supported eccentrically at the belt shaft, which, at normal operation of the safety belt, is disposed outside of the inner teeth of a control part which surround the control pawl, so that the belt shaft can freely rotate, but in the case of danger the locking pawl is moved a certain angle, for example, by the blocked control disc, and thereby engages with the mentioned locking teeth. As the moving element for the control pawl, conventionally, there is provided a drive projection which axially sticks out from the control disc, which when activated acts at the most outer part of the lever arm of the locking pawl, with the result that a relative long angular path must be traversed for moving the locking pawl into the lock position. This has the disadvantage that after the response of the sensor, the actual locking of the belt shaft occurs timewise after a relatively great control phase. This constitutes considerable delay.

SUMMARY OF THE INVENTION

An object of the present invention is to provide a safety belt roll-up device of the type described in which, for safety reasons, the control phase, i.e. the time between the release of the sensor arrangement and the blocking of the belt shaft, is shortened.

With the foregoing and other objects in view, there is provided in accordance with the invention a safety belt roll-up device of a vehicle with a mechanism for blocking a belt roller on which the belt is wound in case of danger, comprising a housing, a roller shaft rotatably supported in the housing, a control disc rotatably supported on the roller shaft, a vehicle-sensitive sensor or belt-sensitive sensor which when a predetermined acceleration or deceleration of the vehicle is exceeded activates said control disc to effect rotational movement relative to said roller shaft, a control pawl eccentrically and hingeably supported at the roller shaft, whereby said control pawl at the occurrence of said relative motion is moved by said control disc against the force of a spring, and is coupled to a control part with locking teeth, said coupling effecting engagement of a locking lever in said locking teeth, said control pawl and said control disc coupled to each other by a drive-projection, which is arranged in the immediate vicinity of the control pawl-tilt axis at one of these parts, and extends into the motion path of the other part.

Other features which are considered as characteristics for the invention are set forth in the appended claims.

Although the invention is illustrated and described herein as embodied in a safety belt roll-up device, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which:

FIG. 5 is an exploded representation of the roll-up device for a safety belt according to FIGS. 3 and 4, FIG. 6 is an enlarged detail of the control pawl according to FIGS. 3–5.

DETAILED DESCRIPTION OF THE INVENTION

Figure 1:
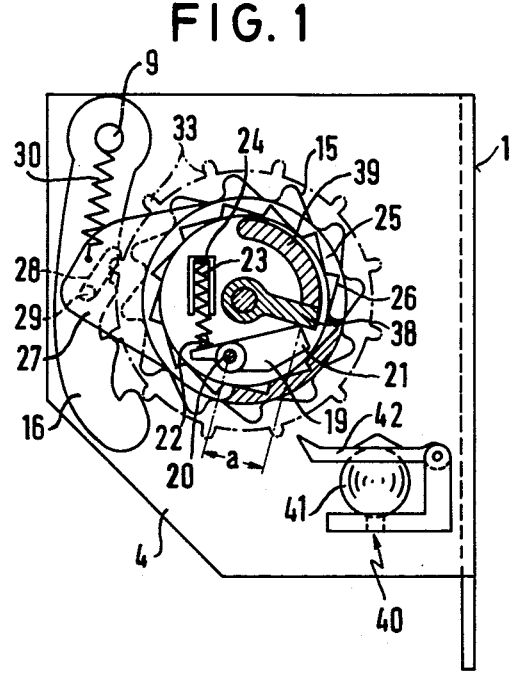
FIGS. 1 and 2 show a plan view and a sectional view of a roll-up device for a safety belt whose detenting locking mechanism contains known functional elements, whose functional shortcomings are to be avoided by the subject of the invention.

The control pawl is moved by the control disc, and is coupled with a control-part which effects the engagement of a locking lever in locking teeth. The control pawl and the control disc can be coupled to each other by a drive-projection. The latter is arranged in the immediate vicinity of the control-pawl-tilt axis at one of these parts, and extends into the motion path of the other part. In the constructions according to the invention, the pressure-force required for moving the control pawl no longer acts at the long lever arm of the locking pawl, but acts on an additional drive projection, which is in the immediate vicinity of the tilt-axis of the control pawl, or acts on the control pawl, independently of the arrangement of the locking pawl. Preferably, the drive projection is arranged like a crank pin of a swinging crank whose axis is parallel to the tilt axis of the control pawl. This gives the advantage that the lever arm between the tilt axis and the drive arm can be kept very small, so that the control phase is markedly reduced in comparison to the known devices.

The drive projection may be arranged at the control pawl. The control disc is provided at the side which is turned toward the control pawl with a drive-groove in the form of a slot directed in a radial direction and in which slot the drive projection is form-fittingly guided. This makes the construction of the control disc very simple and cheaper technically because the formed operating cam is not required. Furthermore, by the form-fitting guiding of the drive projection in the slot-like drive groove, one achieves a reaction of the control pawl to the motion of the control disc without any delay, and also a delay-free resetting of all parts of the detenting locking device.

The control pawl is hingeably supported at a support plate which is in fixed connection with the belt roller with respect to rotation. The support plate is provided with a stop for the control pawl, a support element for the pressure spring associated with the control pawl, and with an axial bearing projection for supporting the freely rotatable control disc. A control part is rotatable at the circumference of the disc-shaped support plate. The control part is provided with a crank-like control lug for the locking lever and has inner teeth at the height of the control pawl which can engage with the latter. By these developments, a simplification of the safety belt roll-up device is achieved, with respect to construction and assembly, i.e. by assigning several functions to a support plate which is connected to the belt shaft, namely, the support function for the locking pawl, control part and control disc. The support plate is connected to the belt shaft by screws.

Further advantages result from the fact that there is a damping spring placed between the two disc parts of the control disc, whereby a small rotation of one disc part is still possible at the control by the sensor mechanism after the outer disc part has been blocked by the vehicle sensitive sensor. This does not inhibit in any way the immediate transfer of the lock-command originating from the sensor, but by the capability of an elastic relative rotation of the following parts engagement difficulties, for example tooth to tooth position of the locking pawl and the associated inner teeth, are reliably avoided.

Further advantageous details of the invention will be explained with the aid of the typical embodiment shown in the drawing and described in the following.

First, the parts which are common with respect to all figures of both versions, and also the functioning of the roll-up device for a safety belt will be explained.

Figure 3:
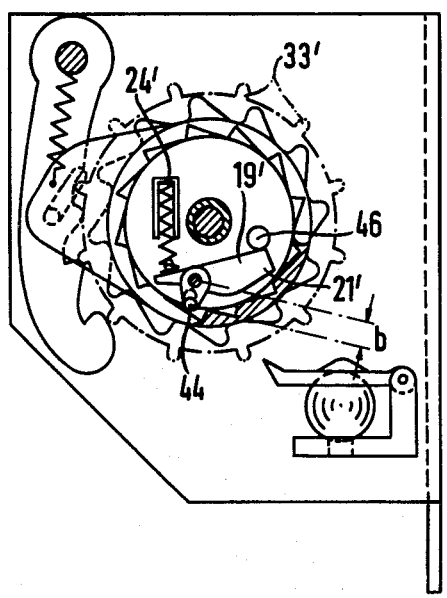
FIGS. 3 and 4 show the roll-up device for a safety belt according to the invention in a plan view and a sectional view, similar to FIGS. 1 and 2. The control pawl and the crank-like control lug of the control part are of particular interest.
Figure 4:
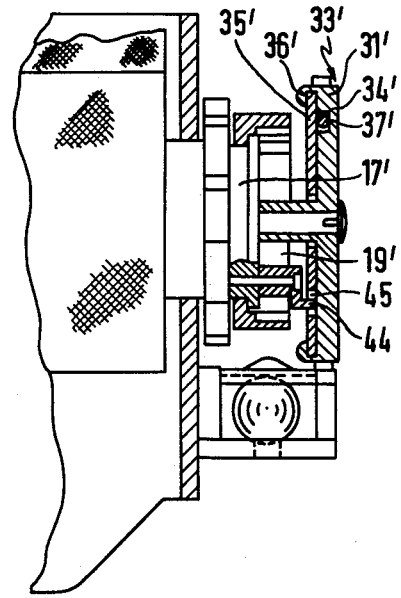

A stable, U-shaped frame 1 represents the supporting part of the automatic roll-up device which can be fastened with its intermediate leg 2 at the vertical strut of the frame of a motor vehicle. In the free legs 3 and 4 of the frame, there are bearing holes 5, in which the belt shaft 6 of a belt roller is rotatably supported. The thickened end 7 of a flexible safety belt 8 is connected with the belt shaft 6. A support rod 9 for reinforcing the frame 1 is arranged between the free legs 3 and 4, and extends beyond leg 4. The roller axis 6 is stiffened by a rigid insert 10. On the left side in FIG. 5, the belt shaft 6 is connected with a return spring 11 which lies at a support plate 12, and is covered by a cover 13 which can be pushed onto the leg 3. On the opposite side of the frame, a load carrying locking wheel 14 with its locking teeth 15 is connected with the belt shaft 6 by a form fit with the insert 10 and by screws so that they are in a fixed connection with respect to rotation. A locking lever 16 is in functional connection with the locking wheel 14. The locking lever 16 is swingeably supported on the support rod 9. A disc-like support plate 17 (FIGS. 1, 2) or 17' (FIGS. 3-5) is fastened on the roller shaft 6 and fixed thereto with respect to rotation. The support plate 17 or 17' is provided with an axial bearing projection 18 on which a control pawl 19 (FIGS. 1, 2), or 19' (FIGS. 3-6) is supported so that it can swing on a bearing pin 20. In both embodiments, the pawl 19 or 19' is designed as a two-armed lever. The end of one lever arm serves as the pawl detent 21 or 21', and the other end is provided with a pin-like retaining element 22 or 22' for a pressure spring 23, which thrusts against a support element 24 or 24' of the support plate 17 or 17'. A control-part 25 is supported on the circumference of the round support-plate 17, 17' so that it can freely rotate. The control-part 25 has inner teeth 26 and also is provided with a crank-like control lug 27. A drive pin 29 of the locking lever 16 is form-fittingly guided in a slanted slot 28 in the control lug 27, whereby the control part 25 is pushed into the non-operative position shown in the drawing by a spring 30. The spring 30 is, on one side, attached at the support rod 9 and at the other side at a pin in the control lug 27. A control disc designated generally by 31 (FIGS. 1, 2) or 31' (FIGS. 3–5), shown in the FIGS. 1 and 3 by dash-dot lines, is pushed onto the bearing projection 18 of the support plate 17, or 17', and secured by a retainer part 32. Thus, the control disc in both embodiments consists of two disc-parts, an outer disc part 34 or 34' with control-teeth 33 or 33', which serves as a mass-disc, and an inner disc-part 35 or 35'. Both disc-parts held together by rolled over edge projections 36, 36', are coupled together by a spiral spring-like spring element 37 or 37', which is disposed in a recess between the disc-parts, in such manner that they can be rotated with respect to each other against a spring force.

Figure 2:
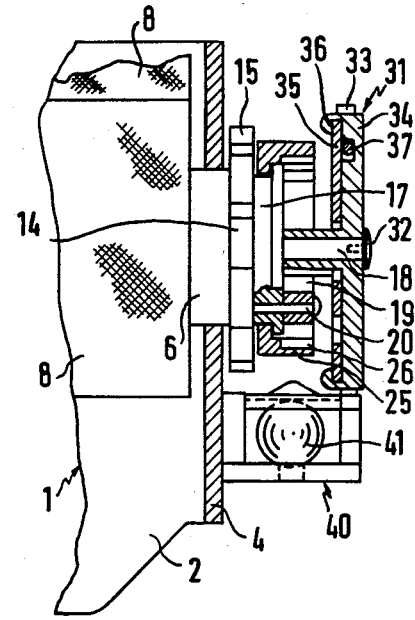

In the embodiment according to FIGS. 1 and 2, the control disc 31 is provided with an axial operating cam 38 which, in the non-operative position, contacts a stop 39 of the support plate 17. The control pawl 19 bears on this cam 38 at the height of the pawl detent 21 by the force of the pressure spring 23. Now, if a strong deceleration or acceleration occurs in the vehicle, for example in the case of a crash, a vehicle sensitive sensor-arrangement 40 is released. Sensor arrangement 40 has a mass-ball 41 which can move from its medium position, and a hingeable lever 42 which engages in the control teeth 33 of the control disc 31, and arrests the latter instantaneously. This causes a relative rotation of the blocked control disc 31 and the belt shaft 6, or support plate 17, whereby the cam 38 is moved and presses the control pawl 19 into the inner teeth 26 of the control part 25. This engagement can also be effected by a sensor arrangement which responds to the belt, formed by the control disc 31 itself, which acts as an inertial mass (mass-disc), which remains by inertia in its instantaneous position at a sudden pull-out of the belt, and thereby causes the control-pawl 19 to move to the lock-position. Thereby, the control part 25 is rotated, and hinged over the curved guide of the locking lever 16, and engages with the locking teeth of the locking wheel 14. The long lever arm a, i.e. the distance from the center of bearng pin 20 to the pressure point between control pawl 19 and cam 38 requires a relatively long angular path of the triggering element which is associated with a time delay in the triggering phase, that is, increased response time.

In the embodiment according to FIGS. 3–6, this angular path- or locking path, which the triggering element, i.e. the control disc, must move, is considerably shortened. The control pawl 19' is formed according to FIG. 6, and is provided at one lever arm with pawl detent 21', and at the other lever arm with the retaining element 22', and with an either formed or otherwise secured crank arm 43, which has a drive projection 44 in the form of a pin which is parallel to the axis. The pin extends to the height of the control disc 31', and engages there form-fittingly in a slot-like, radially directed drive groove 45 in the inner disc part 35' of the control disc 31'. In the non-operative position, the control pawl 19' which is supported on the support plate 17' bears on a stop pin 46 of the support plate. As clearly shown in FIG. 3, hereby the acting lever arm b is considerably shorter, so that, when operated, a shorter angular path of the control disc and thereby of the whole detenting mechanism is effected, and thereby also a shorter trigger phase. Preferably, this lever arm is approximately ½ of the length of the lever arm with the pawl detent 21. A cam at the control disc is not required because of the coupling between drive projection 44 and drive groove 45. Further details of this second embodiment and their functions were explained already with the aid of the FIGS. 1, 2 and 5. In both embodiments, a cover 46' can be attached onto the detenting locking mechanism. Also in both embodiments, the detenting locking mechanism returns automatically to the non-operative position after the load has been removed from the belt, so that the belt band can again normally be pulled out or rolled in.

I claim:

1. A safety belt roll-up device for cooperating with a safety belt to restrain an occupant of a vechicle during an accident, said roll-up device comprising a base, a roller supported on the base and rotatable relative to the base to roll-up a safety belt, a locking wheel connected with said roller for rotation therewith during rolling-up and unrolling of the safety belt, a locking lever connected with said base and movable between a disengaged position in which said locking wheel and roller are rotatable relative to said base and an engaged position in which said locking lever restrains rotation of said locking wheel and roller in a direction corresponding to unrolling of the safety belt, rotatable support plate means connected with said roller for rotation therewith, control part means rotatable about the axis of rotation of said support plate, first force transmitting means for moving said locking lever from the disengaged position to the engaged position upon rotation of said control part means, control pawl means mounted on said support plate means for pivotal movement about an axis which is offset from the axis of rotation of said support plate means, stop surface means connected with said support plate means for rotation therewith, said control pawl means being pivotal between a first position in which said control pawl means engages said stop surface means and is spaced from said control part means and a second position in which said control pawl means is spaced from said stop surface means and engages said control part means to rotate said control part means with said support plate means to move said locking lever from the disengaged position to the engaged position, control disc part means rotatable with said support plate means during rotation of said roller, sensor means for retarding rotation of said control disc part means upon the occurrence of an accident, and second force transmitting means for transmitting force from said control disc part means to said control pawl means upon retardation of rotation of said control disc part means to pivot said control pawl means from the first position to the second position to thereby rotate said control part means and move said locking lever from the disengaged position to the engaged position, said second force transmitting means including means for transmitting force from said control disc part means to said control pawl means from a location on said control disc part means which is: (1) spaced from the axis about which said control pawl means pivots by a distance which is less than the distance between a portion of said control pawl means which engages said control part means and the axis about which said control pawl means pivots and (2) disposed further from the axis of rotation of said control disc part means than the distance from the axis of rotation of said support plate means to the axis about which said control pawl means pivots.

2. A safety belt roll-up device as set forth in claim 1 wherein said second force transmitting means includes a drive-projection extending parallel to the axis about which said control pawl means pivots, said control disc part means having surface means for defining a slot-like drive groove, said drive projection engaging form-fittingly in the slot-like drive groove, said control pawl means and said control disc part means coupled to each other by the drive-projection and the slot-like drive groove whereby said control pawl at the occurrence of retardation of rotation of said control disc part means is immediately moved by said control disc part means.

* * * * *